United States Patent
Raja et al.

(10) Patent No.: US 11,896,970 B2
(45) Date of Patent: Feb. 13, 2024

(54) GAS AND LIQUID DISTRIBUTOR FOR BUBBLE COLUMN REACTOR

(71) Applicant: HINDUSTAN PETROLEUM CORPORATION LIMITED, Bengaluru (IN)

(72) Inventors: Kanuparthy Naga Raja, Bengaluru (IN); Ramachandra Rao Bojja, Bengaluru (IN); Bhavesh Sharma, Bengaluru (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 0 days.

(21) Appl. No.: 17/799,237

(22) PCT Filed: Feb. 12, 2021

(86) PCT No.: PCT/IN2021/050138
§ 371 (c)(1),
(2) Date: Aug. 11, 2022

(87) PCT Pub. No.: WO2021/161344
PCT Pub. Date: Aug. 19, 2021

(65) Prior Publication Data
US 2023/0072605 A1    Mar. 9, 2023

(30) Foreign Application Priority Data

Feb. 12, 2020   (IN) .............................. 202021006163

(51) Int. Cl.
*B01J 8/22*    (2006.01)
*B01J 4/00*    (2006.01)

(52) U.S. Cl.
CPC ................. *B01J 8/22* (2013.01); *B01J 4/004* (2013.01); *B01J 2204/002* (2013.01);
(Continued)

(58) Field of Classification Search
CPC ....... B01J 8/22; B01J 8/44; B01J 8/008; B01J 4/004; B01J 2208/00902; B01J 2208/0092;
(Continued)

(56) References Cited

U.S. PATENT DOCUMENTS 5,384,336 A    1/1995  Koros
2016/0310925 A1  10/2016 Steynberg et al.

FOREIGN PATENT DOCUMENTS

WO    2021/161344 A1    8/2021

OTHER PUBLICATIONS

International Search Report and Written Opinion for PCT/IN2021/050138 dated May 27, 2021, all pages.

*Primary Examiner* — Lessanework Seifu
(74) *Attorney, Agent, or Firm* — Bradley Arant Boult Cummings LLP

(57) ABSTRACT

Bubble column reactor assembly (100) is provided, the assembly comprising: a reactor vessel (104) comprising a bottom end and a top end; a pre-distributor plate (150) disposed above the bottom end of the reactor vessel (104) to distribute gas in a liquid, the plate comprising a bottom surface facing the bottom end of the reactor vessel (104) and a top surface opposite to the bottom surface. The pre-distributor plate (150) comprises a plurality of perforations (206), each perforation (206) comprising: a duct (170) projecting from the bottom surface of the pre-distributor plate; and a cap (180) enclosing the duct (170) and the perforation (206). The cap (180) comprises a plurality of openings (210). A gas distributor (110) is disposed below the pre-distributor plate (150) to receive gas and inject gas into the liquid prior to distribution of gas and the liquid by the pre-distributor plate (150).

18 Claims, 2 Drawing Sheets

(52) U.S. Cl.
CPC ............... *B01J 2208/00902* (2013.01); *B01J 2208/00911* (2013.01); *B01J 2208/00938* (2013.01)

(58) Field of Classification Search
CPC .... B01J 2208/00911; B01J 2208/00893; B01J 2208/938; B01J 2204/002
See application file for complete search history.



GAS AND LIQUID DISTRIBUTOR FOR BUBBLE COLUMN REACTOR

TECHNICAL FIELD

The present subject matter relates generally to bubble column reactors, and in particular to gas and liquid distributors for bubble column reactors.

BACKGROUND

Depletion of light oil reserves has directed the focus of refiners towards the exploration of heavy and extra heavy crude oils. Heavy crude oils may be upgraded, for example, by hydroprocessing, for extracting value out of the heavy oils. Slurry hydrocracking is a hydrogen addition process where heavy oil is contacted with hydrogen gas in the presence of a suitable dual function catalyst that provides cracking and hydrogenation activity. Slurry reactors offer various advantages over fixed-bed reactors and ebullated bed reactors. Fixed bed reactors are limited in terms of their potential to process heavier feeds with high impurity levels. Ebullated bed reactors are more flexible with respect to the feedstock and can handle greater amounts of metals and coke but are limited by overall conversions. Slurry phase reactors are more reliable to achieve higher conversions and can handle feedstock that are typically difficult to process, for example, feedstocks with high impurity levels.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components where possible.

DETAILED DESCRIPTION

Figure 1:
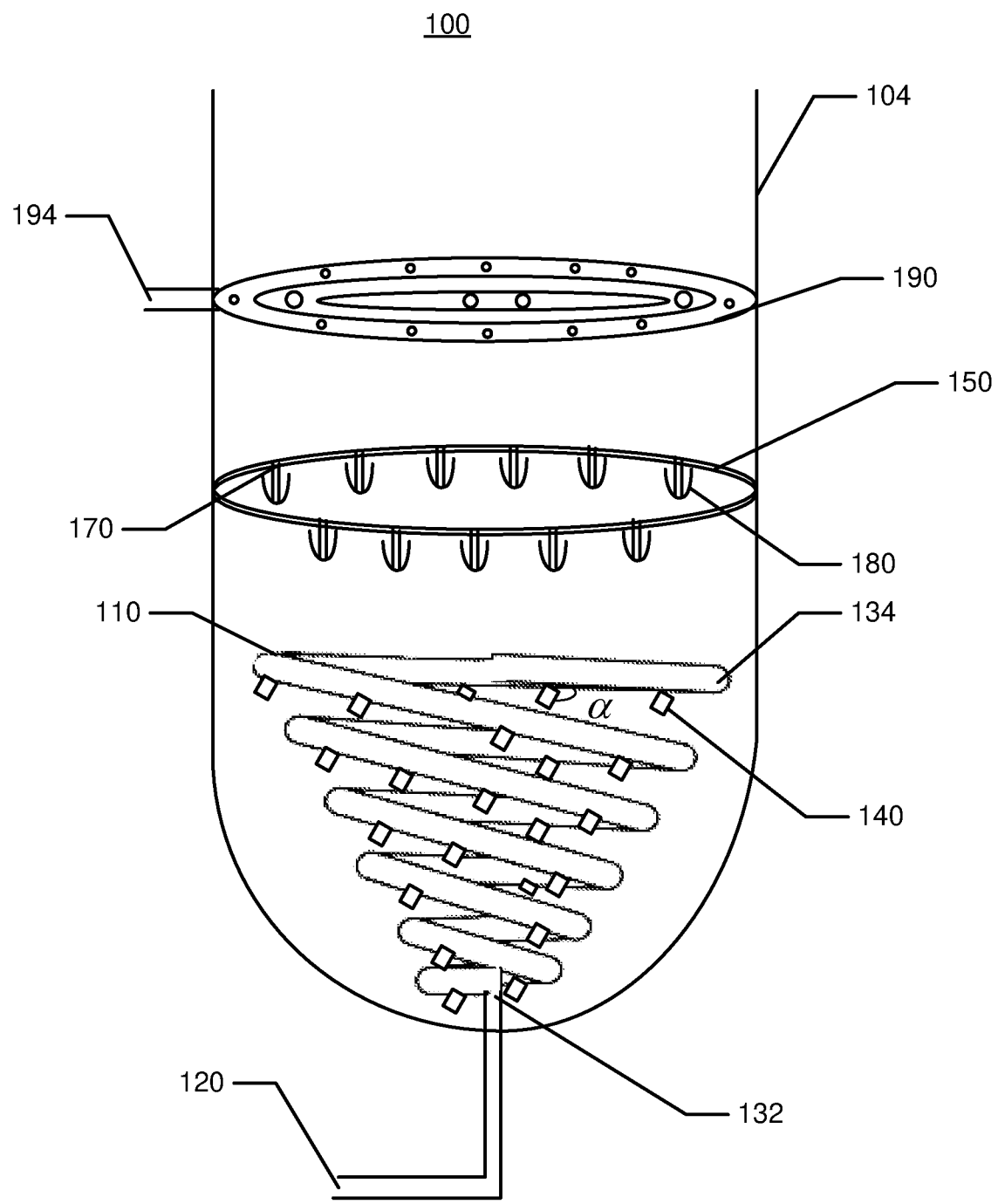
FIG. 1 illustrates an example bubble column reactor assembly, in accordance with an embodiment of the present subject matter.

The present subject matter relates generally to bubble column reactors, and in particular to gas and liquid distributors for bubble column reactors. In an example, the present subject matter relates to three-phase slurry bubble column reactors.

Bubble column reactors are preferred for conducting slurry hydrocracking reactions owing to their excellent heat and mass transfer characteristics. The catalysts employed in slurry hydrocracking reactions are in nano form or in oil soluble form. This offers the flexibility of hydrocracking various kinds of feedstock. In such reactors, a gas is injected into a slurry which comprises catalyst solids suspended in a liquid. A gas distributor is used to inject the gas into the slurry. The gas distributor governs the bubble size distribution and rise velocities of the gas bubbles and is, thus, one of the most critical aspects of a bubble column reactor.

Slurry bubble column reactors are a preferred option for slurry phase hydrocracking of heavy oils. In such a reaction, the gaseous reactant, namely, hydrogen gas, is introduced into a slurry of catalyst dispersed in heavy hydrocarbon feedstock. The gas is introduced using a gas distributor.

The gas distributor design plays an important role in the hydrodynamics of the bubble column. For example, the size of the distributor holes determines the initial bubble size distribution inside the reactor. The initial bubble size distribution has an effect on the regime transition from the homogeneous to the heterogeneous phase. Hence, the design of the gas distributor has an impact on the performance of the bubble column reactors. Improper selection of type and design of the distributor may give rise to problems in terms of non-uniformity in the reactant distribution, creation of dead zones, and improper mixing of the reactants, which can adversely affect the conversion levels and product selectivity.

The present subject matter overcomes these and other problems and relates to bubble column reactor assemblies having gas and liquid distributors. An example bubble column reactor assembly comprises a reactor vessel comprising a bottom end and a top end, and a pre-distributor plate for gas-liquid distribution. The gas may be, for example, hydrogen, and the liquid may be, for example, a slurry comprising catalysts suspended in a liquid feedstock.

The pre-distributor plate is disposed in the reactor vessel at a pre-determined height above the bottom end of the reactor vessel. The pre-distributor plate has a bottom surface and a top surface opposite to the bottom surface. The pre-distributor plate may be disposed in the reactor vessel such that the bottom surface faces the bottom end of the reactor vessel.

The pre-distributor plate comprises a plurality of perforations. Each perforation of the plurality of perforations comprises a duct and a cap. The duct can project from the bottom surface of the pre-distributor plate toward the bottom end of the reactor vessel. The cap may be inverted and be disposed on the bottom surface of the pre-distributor plate and can enclose the duct and perforation. The cap may have a plurality of openings, to allow a liquid and gas mixture to enter the cap and move up the reactor vessel via the plurality of perforations in the pre-distributor plate. Presence of the cap helps in better size distribution of gas as it helps break large gas bubbles into smaller size bubbles and helps in better mixing of gas in the liquid. A liquid inlet and a gas inlet may be provided below the pre-distributor plate towards a bottom end of the reactor vessel.

A gas distributor can be disposed below the pre-distributor plate to receive gas and for injecting gas into the liquid prior to distribution of gas-liquid mixture by the pre-distributor plate. In one example, the gas distributor is a helical pipe coupled to the gas inlet at the bottom end the reactor. The helical pipe comprises orifices. In one example, each orifice may be associated with a nozzle. In said example, the nozzles may be disposed at an angle to the horizontal. The orifices or nozzles or both may be disposed on an outer circumference of the helical pipe at intervals along the pipe circumference.

In operation, gas from a gas inlet may enter the reactor vessel via the helical pipe and exit the helical pipe via the orifices, nozzles, or both. The gas exits at a high velocity and mixes with the liquid in the reactor vessel. Thus, the gas distributor can help in distribution of the gas in the liquid before it passes through the pre-distributor plate for additional improvement in gas distribution.

The reactor vessel comprising the pre-distributor plate and the gas distributor of the present subject matter allows for uniform distribution of gas and liquid in the reactor vessel. The gas exits the gas distributor at a high velocity allowing for enhanced gas distribution in the liquid, elimination of dead zones, and efficient mixing of any settled nano-catalyst that may be present in the liquid. Further, in the example, where the gas distributor is a helical pipe having the plurality of nozzles provided at an angle to the horizontal plate, enhanced mixing can be achieved due to vortex creation, thus, improving heat and mass transfer between gas and liquid in the presence of solids. The manner in which gas is discharged from the helical pipes can also eliminate the attrition of solids, which is otherwise evident with a conventional design in which the jet streams are required to be discharged at a very high velocity to effect better mixing, which can ultimately lead to attrition of catalytic particles.

The presence of the pre-distributor plate helps to disperse gas uniformly inside the reactor vessel by breaking big gas bubbles into smaller bubbles. The caps provided in the pre-distributor plate provides an enhanced mixing between gas and liquid phase and give rise to high mass transfer rates because of diffusion and convection. This provides better distribution of gas and liquid before entering the main reaction portion of the bubble column reactor. Momentum is transferred from gas phase to liquid phase and allows an efficient mixing of any settled nano-sized catalyst.

Thus, the pre-distributor plate and the gas distributor help in mixing the gas and the liquids resulting in optimal dissolution of gas in the liquid phase for high yield and also maintains good recirculation and near isothermal conditions in the reactor vessel. While the present subject matter is described with reference to bubble column reactor assemblies, the pre-distributor plate and the gas distributor may be used in any other device or reactor where multiple phases are handled.

Aspects of the present subject matter are further described in conjunction with the appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1 illustrates an example bubble column reactor assembly with a gas and liquid distributor, in accordance with an embodiment of the present subject matter. The bubble column reactor assembly 100, also referred to as an assembly 100, comprises a reactor vessel 104, a gas distributor 110, and a pre-distributor plate 150. Accordingly, the gas and liquid distributor of the present subject matter may include the pre-distributor plate 150 and the gas distributor 110.

The reactor vessel 104 may be cylindrical in shape. The reactor vessel 104 may comprise a bottom end and a top end. In one example, the bottom end and the top end may be hemispherical or conical in shape. A diameter of the reactor vessel 104 may be in a range of 15 cm to 5 m. In one example, a Height over Diameter Ratio (H/D) of the reactor vessel 104 is in the range of 2 to 20. As will be understood, the diameter and the height of the reactor vessel 104 may be varied based on the application of the reactor vessel 104.

In one example, the gas distributor 110 may be a helical pipe 110. While the following description is provided with reference to a helical pipe used as the gas distributor 110 as an example implementation, it will be understood that other gas distributors may be used in other implementations. In other examples, other methods of pre-mixing the gas and liquid may be used.

The helical pipe 110 is interchangeably referred to herein as pipe 110. In an example when the gas distributor is the helical pipe 110, the helical pipe 110 may be used for injecting the gas into the liquid prior to distribution of the gas and the liquid by the pre-distributor plate 150.

The helical pipe 110 may have a first end 132 that is fluidically connected to a gas inlet 120. The helical pipe 110 may terminate at a second end 134. The second end 134 may be closed and may be disposed away from and above the bottom end of the reactor vessel 104. In one example, the distance from the bottom end of the reactor vessel 104 to the second end 134 of the helical pipe 110 is in a range of 0.5 to 2 times a diameter of the reactor vessel 104.

In an example, the helical pipe 110 may have a uniform pitch. In another example, the helical pipe 110 may have a non-uniform pitch. In one example, a diameter of the helical pipe 110 may be constant from the first end 132 to a second end 134.

In another example, the circumference of the helical pipe 110 may vary from the first end 132 to the second end 134. In said example, a circumference of the helical pipe 110 may progressively increase from the first end 132 to the second end 134. In one example, the circumference of the helical pipe 110 at the first end 132 may be 0.1 times of the diameter of reactor vessel 104 and the circumference of the helical pipe 110 at the second end 134 may be 0.95 times of the diameter of reactor vessel 104. In an example, the ratio of a maximum circumference of the helical pipe 110 to the diameter of the reactor vessel 104 may be in the range of 0.1 to 0.95.

The gas exits the helical pipe 110 at a high velocity. This helps in providing greater turbulence and hence greater mixing of the gas and liquid. The helical pipe 110 may be a right-handed helix or a left-handed helix.

The helical pipe 110 may comprise a plurality of orifices to inject gas received from the gas inlet 120 into the liquid. In another example, the helical pipe 110 may comprise a plurality of nozzles 140. Each nozzle of the plurality of nozzles can be coupled to an orifice of the plurality of orifices. The diameter of the orifices or the plurality of nozzles may be chosen based on a pre-determined superficial gas velocity which may be in a range of 1 cm/s to 40 m/s. In one example, internal diameter of the helical pipe 110 may also be based on the velocity of discharge from the orifices or the nozzles 140. In one example, the velocity of discharge from the orifices or the nozzles 140 may be in a range of 2 cm/s to 50 m/s. Thickness and material of construction of the helical pipe 110 may also depend on required stability and reliability, type of fluids employed, and the velocity of gases.

In the example where the helical pipe 110 comprises the plurality of nozzles 140, the plurality of nozzles 140 may be disposed at an angle $\alpha$ to a horizontal plane and to a surface of the helical pipe 110. Thus, the nozzles 140 may be inclined towards the bottom of the reactor vessel 104. In an example, the angle $\alpha$ may range from 0° to 180°.

In one example, a minimum length to which the nozzles 140 may protrude is equivalent to 1% of an internal diameter of helical pipe 110 and a maximum distance to which the nozzles 140 protrudes is the point where the nozzles 140 touch the nearest or farthest helical pipe layer. For example, a nozzle of the topmost helical pipe layer may extend to a point where it touches the next helical pipe layer present at the bottom of it or it may extend to the point where it touches the last helical pipe layer present at bottom of the bubble column reactor assembly 100. As previously explained, the circumference may vary from the first end 132 of the helical pipe 110 to the second end 134 while the internal diameter may be constant and may be based on velocity of discharge from the nozzles 140. The protruding nozzles can either be limited within the helical pipe circumference or can protrude out from the circumference of helical pipe 110. Further, combinations of both are also possible. In one example, the distance between successive helical pipe layers is equal. In another example, the distance between successive helical pipe layers is unequal. The term "helical pipe layer" used herein refers to one complete helical turn in the helical pipe 110.

Gas can enter the helical pipe 110 via the gas inlet 120 and exit the helical pipe 110 via the plurality of nozzles 140. As the nozzles 140 are inclined, the gas exits the helical pipe 110 at an angle to the horizontal. Liquid may enter the reactor vessel 104 via a liquid inlet (not shown here) at the bottom end of the reactor vessel 104 and can fill the volume of the reactor vessel 104. Hence, the gas exiting the helical pipe 110 mixes with the liquid upon exit from the helical pipe 110. The configuration of the helical pipe 110 and plurality of nozzles 140, alternately, the plurality of orifices, helps in providing a swirling motion to the gas and liquid, which increases turbulence, increases mixing of any nano-catalyst present in the gas-liquid slurry, and eliminates dead zones in the reactor vessel 104.

The assembly 100 comprises the pre-distributor plate 150 disposed in the reactor vessel 104 at a pre-determined height above the bottom end of the reactor vessel 104. In an example the pre-distributor plate 150 may be disposed at a height from the bottom end of the reactor vessel in the range of 0.5 to 3 times the diameter of the reactor vessel 104. In an example, the pre-distributor plate 150 may be concentric to the reactor vessel 104.

The pre-distributor plate 150 may be a plate comprising a bottom surface and a top surface opposite to the bottom surface. The pre-distributor plate 150 may be disposed in the reactor vessel 104 such that the bottom surface faces the bottom end of the reactor vessel 104.

The pre-distributor plate 150 comprises a plurality of perforations. The perforations may extend from the top surface to the bottom surface of the pre-distributor plate 150. A diameter of each perforation of the plurality of perforation may be chosen based on the superficial gas velocity which may be in range of 1 cm/s to 40 m/s. The plurality of perforations may be arranged in any of a triangular pitch, a square pitch, or a circular pitch. A pitch to plate perforation diameter ratio may be in a range 1 to 15.

A duct 170 may project from each perforation of the plurality of perforation in a direction towards the bottom end of the reactor vessel 104. Each perforation and duct 170 may be enclosed by a cap 180 disposed on the bottom surface of the pre-distributor plate 150. In an example, the cap 180 may be welded to the pre-distributor plate 150. The cap 180 comprises a base disposed on the bottom surface of the pre-distributor plate 150 and an apex away from the bottom surface of the pre-distributor plate 150. In one example, a minimum base diameter of the cap 150 is equivalent to 1.1 times a diameter of a perforation and a maximum base diameter of the cap 180 is equivalent to 0.5 times a pitch of the perforations. In one example, a length of the duct may be in a range of 30-90% of a height of the cap 180 from the base to the apex.

The cap 180 may be of any curved shape and disposed so that it encloses the perforation and the duct 170. In one example, the cap 180 may have a plurality of openings (not shown in this figure) disposed around a surface of the cap 180. A diameter of the openings in the cap 180 may be based on superficial gas velocity which may lie in the range of 1 cm/s to 40 m/s.

During operation, gas may be distributed in the reactor vessel 104 after entering the reactor vessel 104 using the helical pipe 110 or any gas distributor known in the art before the gas-liquid mixture passes through the pre-distributor plate 150. As the gas-liquid mixture rises up the reactor vessel 104, the mixture may enter the cap 180 via the openings, enter the duct 170, and may be discharged above the pre-distributor plate 150 from the perforations. In an example, the gas used may be hydrogen. The presence and the shape of cap 180 allows greater mixing of gas and liquid and significantly reduces the number of dead zones in the vicinity of the pre-distributor plate 150. In addition, large gas bubbles are broken down into smaller bubbles, allowing for greater reaction efficiency and higher conversion.

In one example, a secondary gas distributor 190 may be disposed above the pre-distributor plate 150 at a certain height above the pre-distributor plate 150. The minimum height at which the secondary gas distributor 190 may be disposed in the reactor vessel 104 is equivalent to a diameter of reactor vessel 104, from the surface of the pre-distributor plate 150. The maximum height at which the secondary gas distributor 190 is disposed in the reactor vessel 104 is equivalent to 75% of the height of reactor vessel 104. In one example, more than one secondary gas distributor 190 may be provided.

In an example, the secondary gas distributor 190 may be a concentric ring sparger. In other examples, the secondary gas distributor 190 may be any other gas distributor known in the art. In an example, the assembly 100 may comprise a second gas inlet 194 fluidically connected to the secondary gas distributor 190. The second gas inlet 194 allows for additional gas to be fed to the reactor vessel 104. The secondary gas distributor 190 may disperse gas into the reactor vessel 104 in the form of bubbles to maintain the operation of the reaction in bubble flow regimes.

Figure 2:
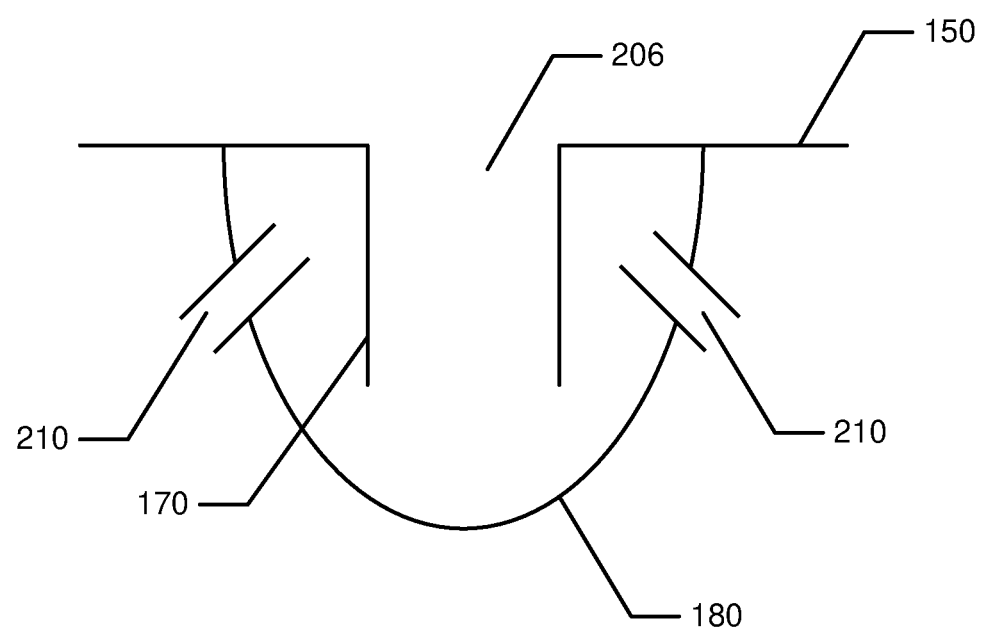
FIG. 2 illustrates an exploded view of an example cap for a pre-distributor plate, in accordance with an embodiment of the present subject matter.

FIG. 2 illustrates an exploded view of an example cap for a pre-distributor plate, in accordance with an embodiment of the present subject matter. The cap 180 may have a curved shape. In various examples the cap 180 may be dome-shaped, conical with a curved top part, or any other shape that has no sharp points or corners. The cap 180 may be attached to the pre-distributor plate 150 using any method known in the art, for example, by welding or using an adhesive. The cap 180 is inverted and is disposed on a bottom surface of the pre-distributor plate 150, the bottom surface being the surface facing the bottom of the reactor vessel 104. The presence of the cap 180 allows greater mixing of liquid and gas and significantly reduces any dead zones in the reactor. The cap 180 may be disposed so that it encloses the duct 170 projecting from perforation 206 in the pre-distributor plate 150 (refer FIG. 1).

The cap 180 may have cap orifices such as one or more openings 210, also referred to as openings 210, to allow the gas-liquid mixture to enter the cap 180. In an example, there may be more than one opening 210. In another example, there may be two openings 210 so that they are 180° apart on a circumference of the cap 180. In another example, there may be four openings so that they are 90° apart on the circumference of the cap 180. In yet another example, there may be several openings 210. The number of openings 210 may be optimized based on the desired pressure drop of the gas-liquid mixture and the size of the cap 180. In an example, the openings 210 may be disposed at portions proximal to a portion of the cap 180 attached to the pre-distributor plate 150. In another example, the openings 210 may be disposed at different heights from the pre-distributor plate 150.

The gas-liquid mixture may enter the cap 180 via the openings 210, then enter the duct 170, and exit the pre-distributor plate 150 via the perforations 206. Thus, the inverted caps provided in the pre-distributor plate 150 provide an enhanced mixing between the gas and liquid phase and give rise to high mass transfer rates because of diffusion and convection. This provides better distribution of gas and liquid before entering the main reaction portion of the reactor. The curved surface of the cap 180 ensures that there are no dead zones around the cap 180. Further mixing of the gas and liquid may occur as the gas liquid mixture rises through the duct 170.

Although embodiments of the present subject matter are described in language specific to structural features, it is to be understood that the specific features and methods are disclosed as example embodiments for implementing the claimed subject matter.

We claim:

1. A bubble column reactor assembly (100) comprising:
   a reactor vessel (104) comprising a bottom end and a top end;
   a pre-distributor plate (150) for gas-liquid distribution, the pre-distributor plate (150) disposed in the reactor vessel (104) at a pre-determined height above the bottom end of the reactor vessel (104), wherein the pre-distributor plate (150) has a bottom surface and a top surface opposite to the bottom surface, wherein the bottom surface faces the bottom end of the reactor vessel (104), wherein the pre-distributor plate (150) comprises:
      a plurality of perforations (206), wherein each perforation (206) of the plurality of perforations (206) comprises:
         a duct (170) projecting from the bottom surface of the pre-distributor plate (150) towards the bottom end of the reactor vessel (104); and
         a cap (180) disposed on the bottom surface of the pre-distributor plate (150) enclosing the duct (170) and the perforation (206), wherein the cap (180) comprises a plurality of openings (210) disposed around a surface of the cap (180); and
   a gas distributor (110) disposed below the pre-distributor plate (150) to receive gas for injecting gas into the liquid prior to distribution of gas and the liquid by the pre-distributor plate (150).

2. The bubble column reactor assembly (100) as claimed in claim 1, wherein the gas distributor (110) is a helical pipe.

3. The bubble column reactor assembly (100) as claimed in claim 2, wherein the helical pipe comprises a plurality of orifices to inject gas into the liquid.

4. The bubble column reactor assembly (100) as claimed in claim 3, wherein the helical pipe comprises a plurality of nozzles (140) disposed at an angle to a horizontal plane to create a vortex for enhanced mixing of the gas into the liquid, wherein each nozzle of the plurality of nozzles (140) is coupled to an orifice of the plurality of orifices.

5. The bubble column reactor assembly (100) as claimed in claim 1, wherein a diameter of the reactor vessel (104) is in a range of 15 cm to 5 m.

6. The bubble column reactor assembly (100) as claimed in claim 1, wherein the Height over Diameter Ratio (H/D) of the reactor vessel (104) is in a range of 2 to 20.

7. The bubble column reactor assembly (100) as claimed in claim 2, wherein the helical pipe comprises a first end (132) towards a bottom end of the reactor vessel (104) and a second end (134) disposed away from and above the bottom end of the reactor vessel (104), wherein a distance from the bottom end of the reactor vessel (104) to the second end (134) of the helical pipe (110) is in a range of 0.5 to 2 times a diameter of the reactor vessel (104).

8. The bubble column reactor assembly (100) as claimed in claim 2, wherein a ratio of a maximum circumference of the helical pipe to a diameter of the reactor vessel (104) is in a range of 0.1 to 0.95.

9. The bubble column reactor assembly (100) as claimed in claim 4, wherein a diameter of each of the plurality of nozzles (140) is based on a pre-determined superficial gas velocity, wherein the superficial gas velocity is in a range of 1 cm/s to 40 m/s.

10. The bubble column reactor assembly (100) as claimed in claim 4, wherein a diameter of the helical pipe is based on a velocity of discharge from the plurality of nozzles, wherein the velocity of discharge is in a range of 2 cm/s to 50 m/s.

11. The bubble column reactor assembly (100) as claimed in claim 4, wherein the angle is in a range of 0° to 180°.

12. The bubble column reactor assembly (100) as claimed in claim 1, wherein a diameter of each perforation of the plurality of perforations (206) is based on a superficial gas velocity, wherein the superficial gas velocity is in a range of 1 cm/s to 40 m/s.

13. The bubble column reactor assembly (100) as claimed in claim 1, wherein the plurality of perforations (206) on the pre-distributor plate (150) are arranged in any one of a triangular pitch, square pitch or a circular pitch.

14. The bubble column reactor assembly (100) as claimed in claim 1, wherein a pitch to plate perforation diameter ratio lies in a range of 1 to 15.

15. The bubble column reactor assembly (100) as claimed in claim 1, wherein the cap (180) comprises a base disposed on the bottom surface of the pre-distributor plate (150), wherein a minimum base diameter of the cap is equivalent to 1.1 times a diameter of the perforation.

16. The bubble column reactor assembly (100) as claimed in claim 1, wherein a maximum base diameter of the cap (180) is equivalent to 0.5 times a pitch of the perforation.

17. The bubble column reactor assembly (100) as claimed in claim 1, wherein a length of the duct (170) is in a range of 30% to 90% of a height of the cap (180) from the bottom surface of the pre-distributor plate (150).

18. The bubble column reactor assembly (100) as claimed in claim 1, wherein a diameter of the openings (210) is based on a superficial gas velocity, wherein the superficial gas velocity is in a range of 1 cm/s to 40 m/s.

* * * * *